United States Patent
Deora et al.

(10) Patent No.: US 10,623,902 B2
(45) Date of Patent: Apr. 14, 2020

(54) RECEIVED SIGNAL STRENGTH TRANSFORMATION METHOD TO ACHIEVE BETTER INDOOR RADIO FREQUENCY LOCALIZATION

(71) Applicant: UNIVERSITY OF SOUTHERN CALIFORNIA, Los Angeles, CA (US)

(72) Inventors: Suvil Singh Deora, Bellevue, WA (US); Bhaskar Krishnamachari, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 15/864,857

(22) Filed: Jan. 8, 2018

(65) Prior Publication Data

US 2018/0199161 A1 Jul. 12, 2018

Related U.S. Application Data

(60) Provisional application No. 62/443,513, filed on Jan. 6, 2017.

(51) Int. Cl.
| | |
|---|---|
| *H04W 4/029* | (2018.01) |
| *G01S 5/02* | (2010.01) |
| *H04B 17/318* | (2015.01) |
| *H04B 1/7105* | (2011.01) |
| *G01S 5/10* | (2006.01) |
| *H04W 52/24* | (2009.01) |
| *H04W 4/02* | (2018.01) |
| *H04W 4/33* | (2018.01) |
| *H04W 4/38* | (2018.01) |

(52) U.S. Cl.
CPC .......... *H04W 4/029* (2018.02); *G01S 5/0252* (2013.01); *G01S 5/0284* (2013.01); *G01S 5/10* (2013.01); *H04B 1/71057* (2013.01); *H04B 17/318* (2015.01); *H04W 4/02* (2013.01); *H04W 4/33* (2018.02); *H04W 52/242* (2013.01); *H04W 52/245* (2013.01); *H04W 4/38* (2018.02)

(58) Field of Classification Search
CPC . H04W 4/029; H04W 52/242; H04W 52/245; H04W 4/02; H04W 4/33; H04B 17/318; H04B 1/71057; G01S 5/0252; G01S 5/0284; G01S 5/10
See application file for complete search history.

(56) References Cited

PUBLICATIONS

Deora et al. (IEEE International Conference on Distributed Computing Sensor Systems, 2014, p. 43-50).*
Liu et al. (2009 International Conference on Information Engineering and Computer Science, 2009, pp. 1-4).*
Yu et al. (IEEE fifth international conference on advanced computational intelligence, Oct. 18-20, 2012).*
Yedavalli et al. (IEEE Transactions on Mobile Computing, vol. 7, No. 1, Jan. 2008, p. 81-94).*

* cited by examiner

*Primary Examiner* — Nay Tun
(74) *Attorney, Agent, or Firm* — Brooks Kushman P.C.

(57) ABSTRACT

A method for localizing a mobile device in a physical space based on radio signals received from transmitters in the physical space includes a step of transforming a received signal strength vector to produce a transformed received signal strength vector. Sequence based localization is performed on the transformed RSS vector with a different ideal sequence centroid table.

21 Claims, 17 Drawing Sheets

| Sequence | Centroid |
|---|---|
| $\{s_{11}, s_{12}, ..., s_{1N}\}$ | $(x_1, y_1)$ |
| $\{s_{21}, s_{22}, ..., s_{2N}\}$ | $(x_2, y_2)$ |
| $\{s_{31}, s_{32}, ..., s_{3N}\}$ | $(x_3, y_3)$ |
| $\{s_{41}, s_{42}, ..., s_{4N}\}$ | $(x_4, y_4)$ |
| $\{s_{i1}, s_{i2}, ..., s_{iN}\}$ | $(x_i, y_i)$ |
| ... | ... |
| $\{s_{L1}, s_{L2}, ..., s_{LN}\}$ | $(x_L, y_L)$ |

EW-SBL

*Fig. 6B*

| Sequence | Centroid |
|---|---|
| $\{s_{11}, s_{12}, ..., s_{1N}\}$ | $(x_1, y_1)$ |
| $\{s_{21}, s_{22}, ..., s_{2N}\}$ | $(x_2, y_2)$ |
| $\{s_{31}, s_{32}, ..., s_{3N}\}$ | $(x_3, y_3)$ |
| $\{s_{41}, s_{42}, ..., s_{4N}\}$ | $(x_4, y_4)$ |
| $\{s_{i1}, s_{i2}, ..., s_{iN}\}$ | $(x_i, y_i)$ |
| ... | ... |
| $\{s_{L1}, s_{L2}, ..., s_{LN}\}$ | $(x_L, y_L)$ |

WR-SBL

*Fig. 6A*

Algorithm 1: WR-SBL Server Side Algorithm

Input: Number of Nodes: n
Input: Topology: Set $S$ of $(i, X_i, Y_j) \forall i = 1 \ldots n$
Input: Tx Pwr: $\vec{P_T} = \{\vec{P_{T1}} \ldots \vec{P_{Ti}} \ldots \vec{P_{Tn}}\}$
Input: Building Dimensions: $(l, b)$ and Origin
Input: Path loss model Parameters: $(\eta, K_{dB})$ /* INITIALIZATION */
begin
    *Read Inputs*
    If $\vec{P_T}$ for S doesn't exists then
        /* Using Simulated Annealing */
        $\vec{P_T^*} \Leftarrow SimAnneal(S)$
    else
        $Fetch\ \vec{P_{Tij}^*}\ for\ S$
    $\vec{\omega} = \vec{P_T^*} - \vec{P_T}$
    $T \Leftarrow GenSeqCentTbl(\vec{P_T^*}, S)$ /* LOCALIZATION ENGINE */
while 1 do
    $\vec{rss} \Leftarrow Listen()$
    $\vec{\omega rss} = \vec{rss} + \vec{\omega}$
    $\vec{seq} \Leftarrow SeqGenrtr(\vec{\omega rss})$
    $(x, y, k_d) \Leftarrow KendalTauSearch(\vec{seq}, T)$
    $LogData(x, y, k_d, \vec{rss})$
    $REPLY(x, y)$

Fig. 7A

Algorithm 2: Enhanced WR-SBL Server Side Algorithm

Input: Number of Nodes: n
Input: Topology: Set $S$ of $(i, X_i, Y_i) \forall i = 1 \ldots n$
Input: Tx Pwr: $\vec{P_T} = \{\vec{P_{T1}} \ldots \vec{P_{Ti}} \ldots \vec{P_{Tn}}\}$
Input: Building Dimensions: $(l, b)$ and Origin
Input: Path loss model Parameters: $(\eta, K_{dB})$ /* INITIALIZATION */
begin

*Read Inputs*
    if $\vec{P_T^s}$ *for S doesn't exists* then
        /* Using Simulated Annealing */
        $\vec{P_T^s} \Leftarrow SimAnneal(S)$
    else
        Fetch $\vec{P_T^s}$ for $S$
    $\vec{\omega} = \vec{P_T^s} - \vec{P_T}$
    $T \Leftarrow GenSeqCentTbl(\vec{P_T^s}, S)$ for $Z_{ij} \forall i, j$ do
        if $\vec{P_{Tij}^s}$ *for S doesn't exists* then
            /* Use Simulated Annealing */
            $\vec{P_{Tij}^s} \Leftarrow SimAnneal(S, Z_{ij})$
        else
            Fetch $\vec{P_{Tij}^s}$ for $Z_{ij}, S$
        $\vec{\omega_{ij}} = \vec{P_{Tij}^s} - \vec{P_T}$
        $T_{ij} \Leftarrow GenSeqCentTbl(\vec{P_{Tij}^s}, S)$ /* LOCALIZATION ENGINE */
while 1 do
    $\vec{rss} \Leftarrow Listen()$
    if *previous location from time slot t - 1 is not known* then
        $\vec{\omega rss} = \vec{rss} + \vec{\omega}$
        $\vec{seq} \Leftarrow SeqGenrtr(\vec{\omega rss})$
        $(x, y, k_d) \Leftarrow KendalTauSearch(\vec{seq}, T)$
        $(p, q) \Leftarrow FindZone(x, y)$
    else
        $(p, q) \Leftarrow FindZone(x_{old}, y_{old})$
        $\vec{\omega rss_{pq}} = \vec{rss} + \vec{\omega_{pq}}$
        $\vec{seq_{pq}} \Leftarrow SeqGenrtr(\vec{\omega rss_{pq}})$
        $(x, y, k_d) \Leftarrow KendalTauSearch(\vec{seq_{pq}}, T_{pq})$ $LogData(x, y, k_d, \vec{rss})$
    $REPLY(x, y)$

*Fig. 7B*

RECEIVED SIGNAL STRENGTH TRANSFORMATION METHOD TO ACHIEVE BETTER INDOOR RADIO FREQUENCY LOCALIZATION

CROSS-REFERENCE TO RELATED APPLICATIONS

This application claims the benefit of U.S. provisional application Ser. No. 62/443,513 filed Jan. 6, 2017, the disclosure of which is hereby incorporated in its entirety by reference herein.

STATEMENT AS TO FEDERALLY SPONSORED RESEARCH

This invention was made with government support under Contract No. 1201198 (An Integrated Mobile Sensor System for Occupancy and Behavior Driven Building Energy Management) awarded by NSF (National Science Foundation). The government has certain rights in the invention.

TECHNICAL FIELD

This specification relates to systems and techniques for tracking the position of mobile/radio devices.

BACKGROUND

The enormous success of devices such as smartphones and tablets has propelled the field of context aware computing into the forefront of research and development. Every application in today's smartphone market utilizes location information to not only provide relevant information to the user but also place relevant advertisements to generate revenue. A very important piece of the puzzle in this framework is indoor localization. The most popular way of doing indoor localization is to measure received signal strength (RSS) values from the neighboring WIFI access points and process them using a localization algorithm to find a location estimate.

RSS based localization algorithms come in many different flavors, they either utilize the empirical relationship between the observed path-loss and distance or the spatial locality of observed RSS vector for estimating the location. Some of the most popular techniques are Maximum Likelihood Estimate (MLE), Least Square Estimate (LSE), Fingerprinting and Sequence Based Localization (SBL). Some of the most popular techniques are Maximum Likelihood Estimate (MLE) [1], Least Square Estimate (LSE) [2], Fingerprinting [3] [4] and Sequence Based Localization (SBL) [5] [6]. A consequence of the complex nature and the many tradeoffs involved in setting up an indoor localization system is that each technique may have better utility in some dimension than the others. The localization accuracy for every algorithm could be potentially affected by various factors such as RF propagation loss, multi-path fading, and the location and density of reference nodes.

SBL utilizes periodic beacon transmission from the fixed beacon nodes. Target nodes receive these beacon packets and generate a RSS vector. A ranked version of this RSS vector called a sequence is then compared against a set of ideal sequences generated based on the known location of the beacon nodes. The co-ordinates corresponding to the best matched ideal sequence are then given out as the localization result. This is possible because each sequence corresponds to a unique region in the 2-dimensional localization space, these regions are referred to as SBL faces. SBL exploits this unique geometric relationship for performing localization. SBL assumes all beacon nodes transmit at equal power, therefore the size, shape and the total number of faces only depends upon the number of beacon nodes and their positions. To understand how ideal sequences are generated, consider two beacon nodes A, B as depicted in FIG. 1(A), with equal transmit power $P_{TA}=P_{TB}$. In an ideal case, the perpendicular line bisector of AB represents the line where received signal strength value from beacon node A and B is equal $P_{RA}=P_{RB}$. This equal RSS line divides the localization space into two faces as shown in FIG. 1(A). At any point in the face that includes node A theoretically RSS value ($P_{RA}$) from node A should be greater than the RSS value (PRB) from node B. Therefore, the sequence (ranked RSS vector) for this face is given by (1, 2), similarly for the second region it is (2, 1). Therefore, if the receiver has the beacon node topology information it can approximately localize itself at the centroid of one of the two faces. When the same principle is extended to greater numbers of beacons, the number of regions grow polynomially improving the accuracy of the technique. FIG. 1(B) shows faces and corresponding sequences for a 4-node topology.

It has been shown in [5] that the number of geometrically valid sequences is $O(n^4)$, out of $O(n!)$ total possible sequences. This gives this algorithm noise immunity as well as polynomial time complexity. In a real setting due to noise and multipath fading, the comparison of the observed sequence and the ideal sequences doesn't yield an exact match. To overcome this problem, the SBL algorithm uses the Kendal Tau correlation coefficient as a comparison metric between the sequences.

SUMMARY

In at least one embodiment, the present invention solves one or more problems of the prior art by providing a method for localizing a mobile device in a physical space based on radio signals received from transmitters in the physical space. The method includes a step of transforming a received signal strength vector to produce a transformed received signal strength vector. Sequence based localization is performed on the transformed RSS vector with a different ideal sequence centroid table.

Some embodiments provide technologies relating to tracking the position of mobile/radio devices (such as tags that may be placed on devices or alarms carried by humans) in an indoor or outdoor environment where a set of radio beacons are deployed at known locations. These beacons could be, for example, a WIFI access point network deployed in a hotel/airport/campus.

To improve the accuracy of sequence based localization (SBL) systems, a method involving a mathematical transformation of the received signal strengths from beacon nodes, which improves the localization accuracy without incurring any extra cost is provided. This technique is named as Warped RSS sequence based localization or simply WR-SBL. Traditional SBL uses the observed received signal strength (RSS) at the receiver directly for deducing its location where as WR-SBL uses warped-RSS values to do the same which are in turn calculated by applying a transformation (warping) to the observed RSS values, which are then used to generate a ranked sequence vector for doing sequence based localization.

The invention is a significant enhancement of a state of the art algorithm for localization known as sequence-based localization. Specifically, it applies virtual "warping" to received signal strength readings at a device that needs to be located in such a way as to improve the overall accuracy with very little overhead. WR-SBL doesn't require any kind of additional hardware or software reconfiguration of the WIFI access point network. This makes the implementation very straightforward and of the same complexity as the basic SBL. The applied transformation to the RSS values is linear and computationally simple. This technique can substantially improve the localization accuracy. It should be noted that the methods set forth herein work in both directions, i.e., the beacon nodes could be transmitters while the tracked device is a receiver or the beacon nodes could be receivers while the tracked device is a transmitter.

BRIEF DESCRIPTION OF THE DRAWINGS

FIGS. 6A and 6B. WR-SBL: One Sequence Centroid Table. EW-SBL: Multiple Sequence Centroid Tables, one for each zone.

FIG. 7A provides pseudo code for the WR-SBL method.

FIG. 7B provides pseudo code for the EW-SBL method.

DETAILED DESCRIPTION

Figure 1A:
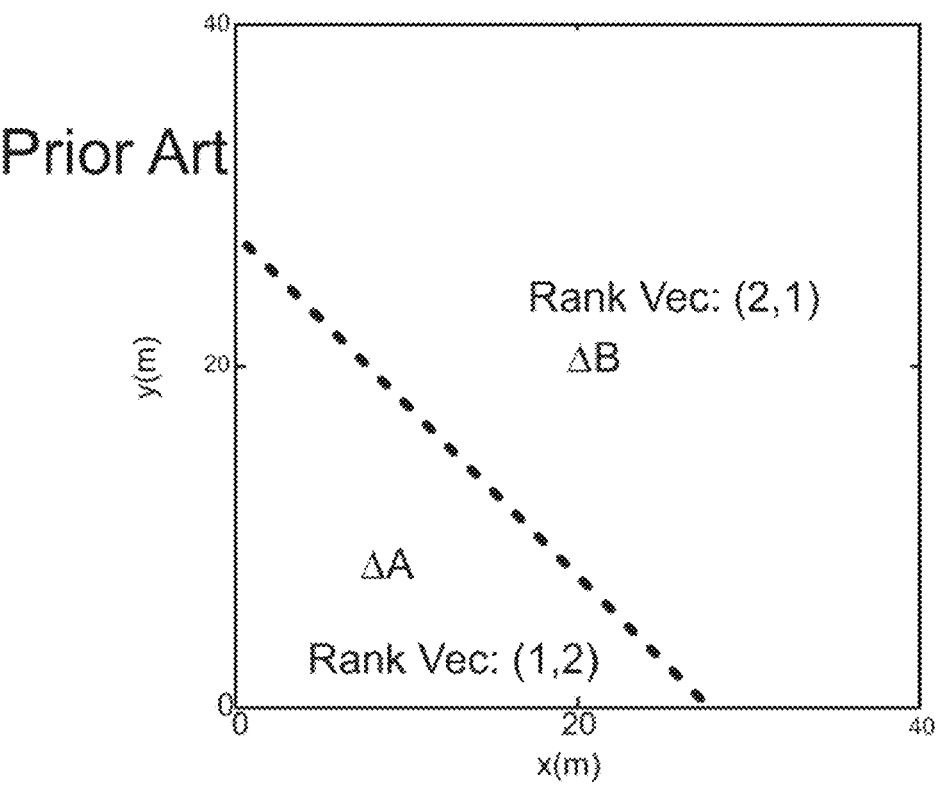
FIGS. 1A and 1B. Sequence-based Localization. (A) Two Beacons—SBL Regions and Equal RSS line. (B) Four Beacons—SBL Regions and Equal RSS lines.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of" where one of these three terms is used herein, the presently disclosed and claimed subject matter can include the use of either of the other two terms.

Abbreviations

"RSS" means received signal strength.
"MLE" means Maximum Likelihood Estimation.
"SBL" means Sequence Based Localization.
"WR-SBL" means warped-received signal strength. Sequence Based Localization.
"EW-SBL" means enhanced warped-received signal strength Sequence Based Localization.

The term "beacon node" means a device that broadcasts its identifier to nearby portable electronic devices.

In an embodiment, a warped-RSS SBL (WR-SBL) method for localizing a mobile device in a physical space based on radio signals received from transmitters in the physical space is provided. With reference to FIGS. 2A-D, the method can be implements in a system 10 that includes a plurality of fixed nodes $12^i$ and one or more mobile devices $14^j$ (i.e., target nodes). Characteristically, the plurality of fixed nodes $12^i$ define a physical space topology having initial Sequence Based Localization (SBL) faces in a physical localization space as set forth above. Moreover, also as set forth above, these fixed nodes define a largest SBL face by their placement alone. This largest SBL face is referred to herein as an initial largest SBL face. The method includes a step of generating one or more received signal strength vectors from wireless signals $16^j$ exchanged between the plurality of fixed nodes $12^i$ and the one or more mobile devices to be located. Each received signal strength vector provides relative signal strengths between one of the mobile devices and each of the fixed nodes. In a refinement, the received signal strength vectors include attenuation from path loss and fading. Each received signal strength vector of the one or more received signal strength vectors is transformed to form a plurality of transformed signal strength vectors such that transformed SBL faces have a largest transformed SBL face that is reduced compared to the initial largest SBL face. In a refinement, the largest transformed signal strength is minimized. A location for each of the one or more mobile devices is determined from the plurality of transformed signal strength vectors. In one refinement, one or more of these steps are performed by the one or more mobile devices. In another refinement, one or more of these steps are performed by the fixed nodes. In still another refinement, one or more of these steps are performed by a server 20 in communication with the plurality of fixed nodes.

Figure 2A:
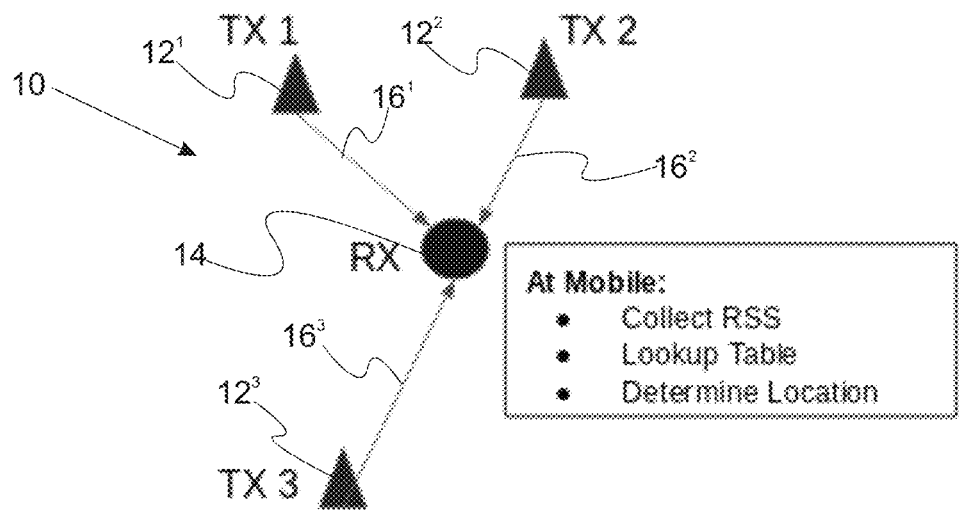
FIG. 2A provides a schematic illustration of a system variation in which the mobile node is a receiver with the location being computed on a mobile device.
Figure 2B:
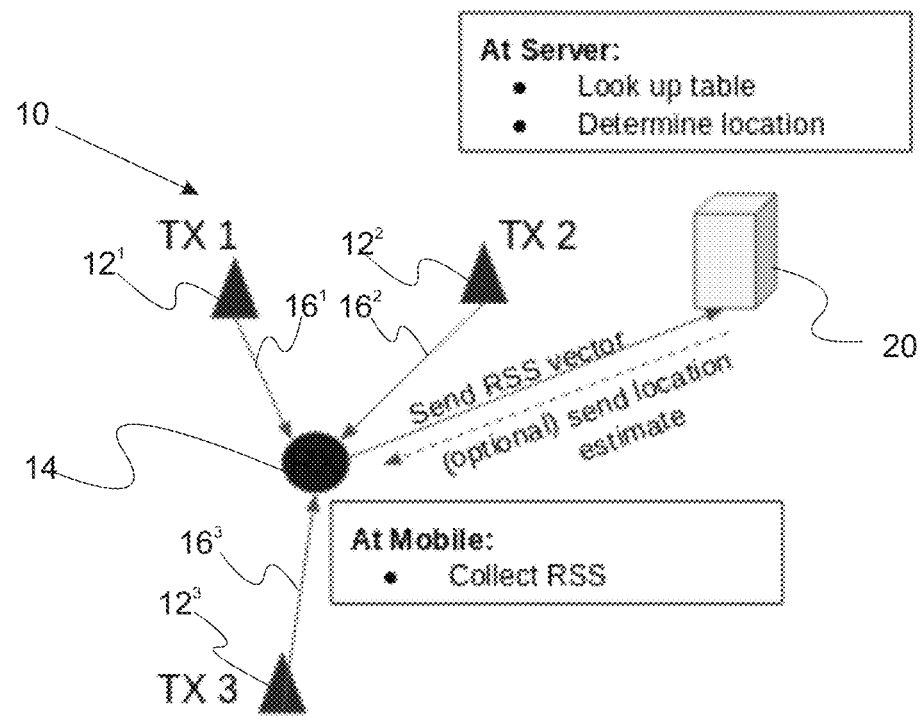
FIG. 2B provides a schematic illustration of a system variation in which the mobile node is a receiver with the location being computed on a server.

FIGS. 2A and 2B provide schematic illustration of a system variation in which the mobile node is a receiver. In this variation, the fixed nodes $12^1$, $12^2$, $12^3$ are beacon nodes that transmit a set of beacon packets to mobile device 14. In this variation, each set of beacon packets $16^1$, $16^2$, $16^3$ is transmitted with an original power such that a vector of transmitted powers is defined. These transmitted packets propagate to the one or more mobile nodes where they are received with a received power (i.e., the received signal strength vector). In the variation depicted in FIG. 2A, the location being computed on mobile device 15 while in the variation of FIG. 2B the location is computed on server 20.

Figure 2C:
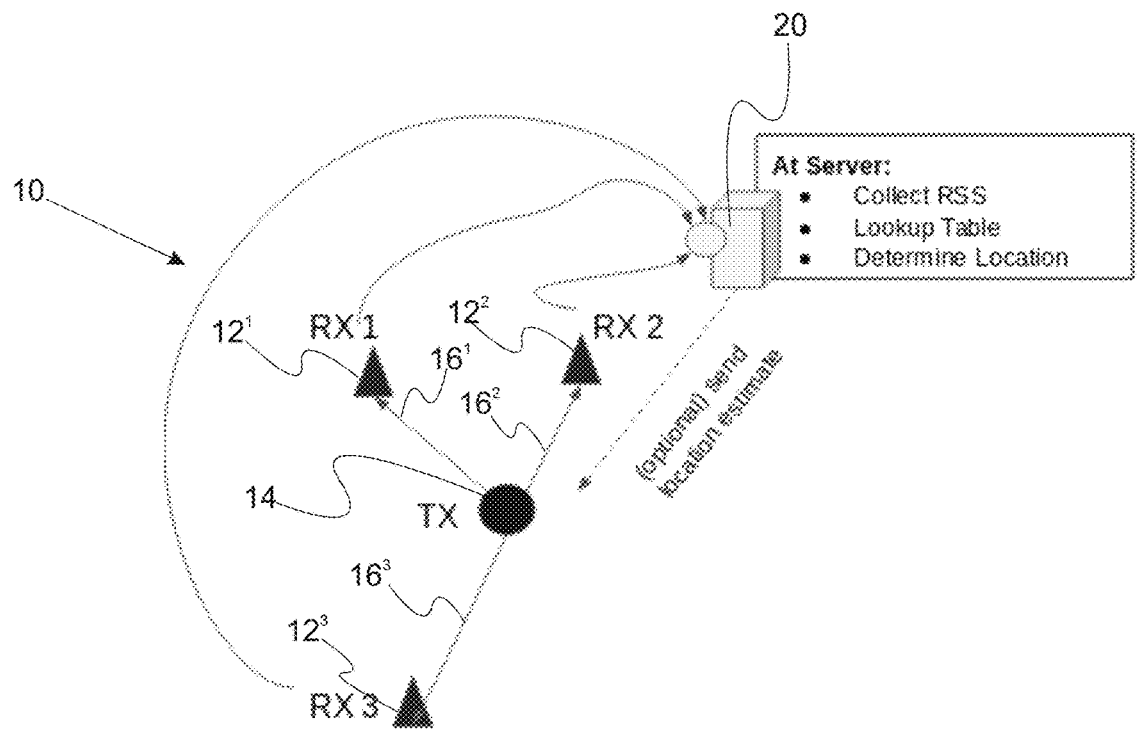
FIG. 2C provides a schematic illustration of a system variation in which the mobile node is a transmitter with the location being computed on a mobile device.
Figure 2D:
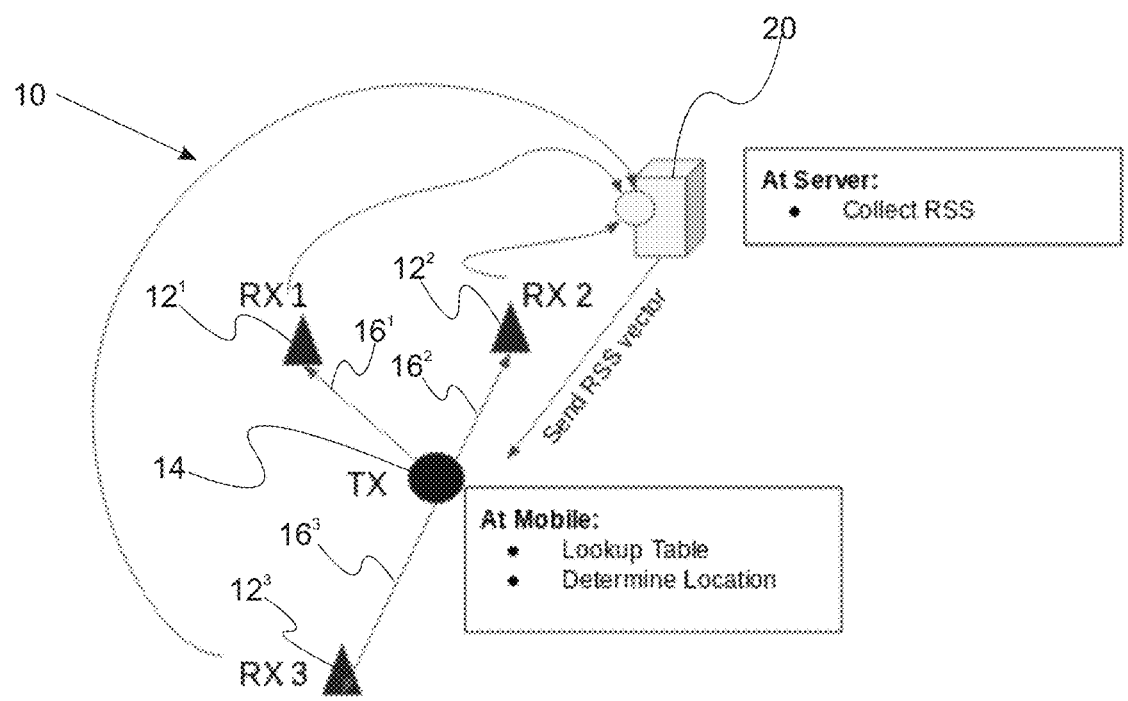
FIG. 2D provides a schematic illustration of a system variation in which the mobile node is a transmitter with the location being computed on a server.

FIGS. 2C and 2D provide schematic illustration of a system variation in which the mobile node is a transmitter. In this variation, the fixed nodes are receiver nodes. In this variation, the transmitted signals $16^1$, $16^2$, $16^3$ propagate to the plurality of fixed nodes $12^1$, $12^2$, $12^3$. In the variation depicted in FIG. 2C, the location being computed on mobile device 15 while in the variation of FIG. 2D the location is computed on server 20.

As set forth above, each received signal strength vector of the plurality of received signal strength vectors is transformed to form a plurality of transformed signal strength vectors such that transformed SBL faces have a largest transformed SBL face that is reduced compared to the initial largest SBL face. In one variation, the transforming includes a step of adding a warp vector to each received signal strength vector. Characteristically, the warp vector is a difference of the optimal transmit power vector and an actual transmit power vector. In a further refinement, a sequence-centroid table is generated from the optimal transmit power vector corresponding to the actual transmit power vector plus the warp vector. The computation for performing the optimization and/or determining the sequence-centroid table can be implemented using Simulated Annealing, or any other blackbox optimization algorithm, local search algorithm, neighborhood search algorithm such as Genetic Algorithms, Tabu Search, Ant Colony Algorithms, Steepest Descent, and the like. This computation can be done on a processor at the mobile device itself or at a computational processor that is external to the mobile device, such as at an edge or cloud computing server. The sequence-centroid table includes a plurality of sequences with a corresponding centroid position. In a refinement, localization is determined by finding a best match sequence in the sequence-centroid table to the received signal strength vector. Once the sequence-centroid table is generated, the computation for taking a given observed RSS vector and transforming it into a location estimate can be done either on the mobile device itself or at a computational processor that is external to the mobile device, such as at an edge or cloud computing server.

In a variation, an enhanced warped-RSS SBL (EW-SBL) improvement to the WR-SBL method is provided. This variation includes a step of dividing physical space into a plurality of pre-defined zones (i.e., forming a course grid). An optimum power vector and an optimal warp vector are determined for each zone of a plurality of pre-defined zone to form a plurality of multiple sequence-centroid tables and a plurality of warp vectors. In this context, the optimization will seek to reduce the area of the face contained within the zone. A current zone in which a target node is located is determined. One warp vector is selected to transform each received signal strength vector at the target node present in the current zone. Finally, the mobile device is localized by finding a best match sequence in a sequence-centroid table for the current zone.

Figure 2E:
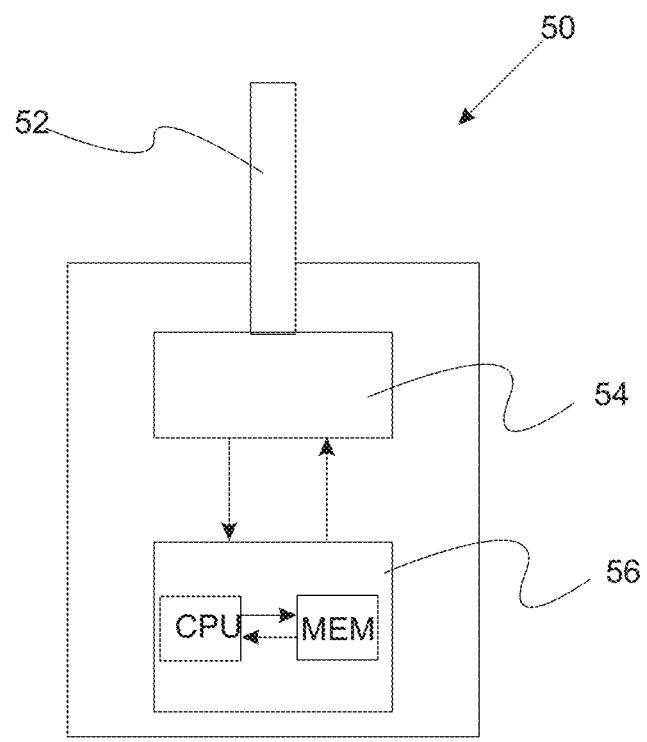
FIG. 2E provides a schematic illustration of a mobile device that implements the methods set forth herein.
Figure 3:
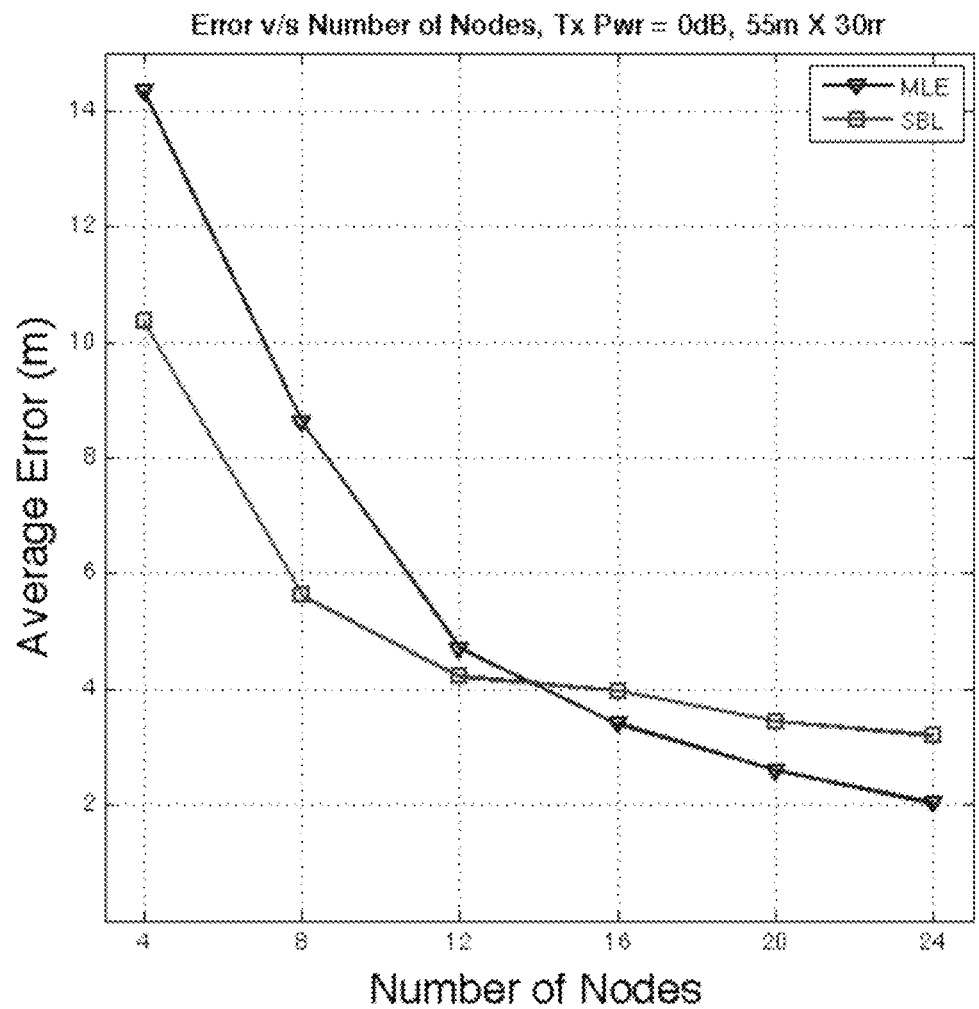
FIG. 3. Simulation results: Node density vs Localization Error.

FIG. 2E provides a schematic illustration of a mobile device that implements the methods set forth herein. Mobile device 50 includes an input port 52 (e.g., an antenna) with a transceiver 54 coupled thereto. Processor electronics 56 is coupled with the transceiver 54, the processor configured to transform a received signal strength vector to a transformed signal strength vector where transformed SBL faces have a largest transformed SBL face that is minimized. In a variation, processor electronics includes a computer processor in communication with a non-transient computer-readable memory. Typically, at least one of the steps set of the method set forth above are encoded in the non-transitory computer-readable memory and executed by the computer processor. In one refinement, each of the steps of the method set forth above are encoded in the non-transitory computer-readable memory and executed by the computer processor. Specific examples of such non-transitory computer-readable memory include. but are not limited to, read only memory (ROM), hard drives, optical drives, removable media (e.g. compact disks, DVD, flash drives, memory cards, etc.), and the like, The following examples illustrate the various embodiments of the present invention. Those skilled in the art will recognize many variations that are within the spirit of the present invention and scope of the claims.

For comparison, the performance of two well-known algorithms for RSS-based localization with respect to this factor is characterized: Maximum Likelihood Estimation (MLE) and Sequence Based Localization (SBL). MLE [1] [7] is a standard technique from classical estimation theory, while SBL (first proposed in [6] and further detailed in [5]) is a geometry-based heuristic. FIG. 2 shows a simulation-based comparison of the average error in terms of the distance between the true and estimated location for MLE and SBL localization algorithms. The simulation considers an area of size 55 m×30 m, where the number of beacon nodes (placed randomly) are varied from 4 to 24, and each data point represents the average of 150 runs at each of 18 random locations in the given area. The simulation assumes a simple path loss RF propagation model with lognormal fading (path loss exponent=2.2, fading variance=20) [8]. The plot shows that while MLE performs well at high densities, SBL is superior between the lower end to the middle of the spectrum. In real indoor environments, the number of access points in range of a given receiver is likely to vary significantly from location to location. More specifically, the fraction of the access points whose locations are known precisely enough to be used for localization could be relatively low in many settings. This motivates us to consider SBL seriously as a localization algorithm, and consider ways to further enhance its performance.

In the experiments details set forth below, WR-SBL and EW-SBL along with the original SBL, Least Square Estimation (LSE) and MLE are evaluated on two real indoor testbeds: an 8-node WIFI testbed and an 18-node IEEE 802.15.4-based low power wireless network testbed. In all cases, we find that EW-SBL outperforms WRSBL, and that they both outperform the original SBL. In all cases, moreover, we find that these schemes are superior to LSE. The proposed algorithms outperform MLE significantly at moderate densities of known nodes (in the WIFI testbed we show a factor of 3 improvement of location error and in the low-power testbed we find a factor of 2 improvement in case of moderate density). In the dense deployment, the proposed schemes are outperformed by MLE, but still offer reasonably good performance, within about 30% of MLE's average error, much better than the original SBL.

In light of these observations, embodiments of the present invention offer a significant advancement in the state of the art for location estimation using RSS measurements in settings where the number of access points with known location is relatively small (say less than 8-10, in a typical office building of approximate dimension 55 m 30 m).

1. WARPED RSS SEQUENCE BASED LOCALIZATION

Figure 1B:
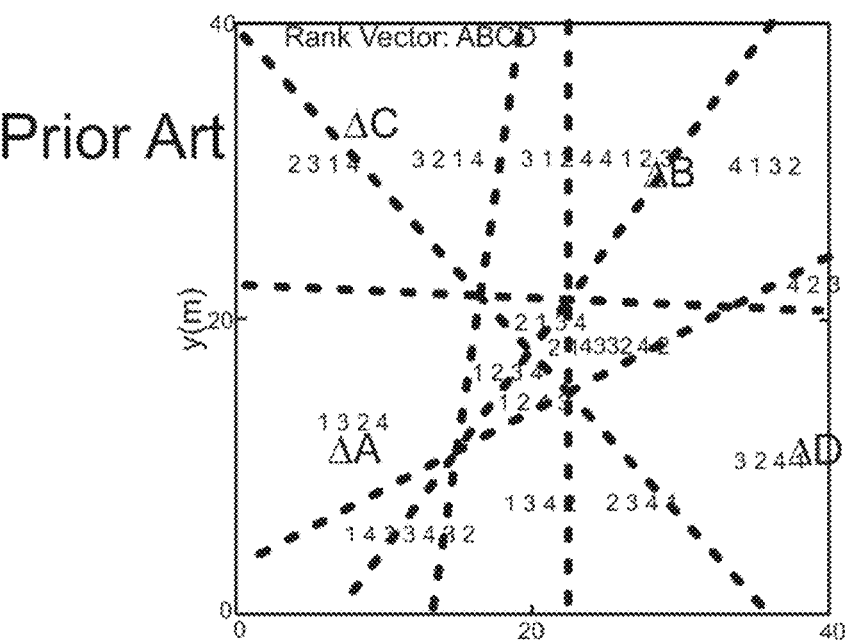

As set forth above, Sequence based localization is a purely geometric technique which doesn't use any additional information other than beacon node locations. This leaves significant room for improvement which is addressed by embodiments of the present invention. In one variation, a signal propagation model is incorporated into SBL to improve the algorithm's accuracy. Another shortcoming of SBL is that the faces are of non-uniform shape and are distributed in an uneven fashion over the entire localization space. This increases the worst-case error which corresponds to the largest face and in turn the average error. For example, in FIG. 1(B) the average error for a target node located in face corresponding to the sequence (2, 3, 4, 1) will be higher than the one located in face with sequence (1, 2, 3, 4).

Embodiments of the present invention implement a novel algorithmic technique which employs the insights gained by path loss model to reorganize the faces uniformly across the entire localization space, significantly reducing the average and worse case localization error. Advantageously, variations implement an algorithm that doesn't require a hardware change or change, in beacon node transmit power settings. Instead these variation uses simple RSS measurements from the beacon nodes, the exact same measurements made and used by SBL. This new algorithm is referred to as Warped RSS sequence based localization or simply WR-SBL. WR-SBL is a two-step algorithm. First, a transformation is applied to RSS vector and then the resulting transformed RSS vector is used to carry out localization using SBL with a different ideal sequence centroid table. The transformation applied to the RSS values is the key to improve the accuracy and is designed to be computationally trivial to apply at run time. In the following sections, we explain these two steps of WR-SBL in detail.

A. Warping: RSS Transformation

To uniformly distribute SBL faces throughout the localization space, a bias vector is added to the RSS vector. We call this transformation "Warping" and the bias vector a "Warp vector". The name is derived from the fact that this simple transformation warps the equal RSS lines such that the SBL faces are reorganized uniformly across the entire localization space. It has been shown in the work described in paper [9] that for any given topology, it is possible to redistribute the SBL faces by changing the transmit power of the beacon nodes. That paper, however, did not show how this can be implemented in a realistic way using the existing WIFI infrastructure, where it is almost impossible to change the transmit power of the access points which is optimized either to provide the maximum coverage or the best quality of service.

The WR-SBL algorithm used in some variations of the present invention achieves a similar uniform distribution of SBL faces but without making any change to the power settings of beacon nodes. WR-SBL adds only a simple mathematical processing step and can be used with any existing WIFI infrastructure without any modification. Consider n beacon nodes with transmit powers $\vec{P_T}=\{\vec{P_{T1}} \ldots \vec{P_{Tn}}\}$ and a pre-set topology in a localization space of area A. The node to be localized q has an observed RSS vector $\vec{P_R}$. Instead of using ranked $\vec{P_R}$ sequence directly for localization as done in SBL, WR-SBL transforms the $\vec{P_R}$ into a warped RSS vector $\vec{W_R}$ which in turn is used to generate the warped RSS sequence for localization. Warping of $\vec{P_R}$ to $\vec{W_R}$ is done by adding a warp vector $\vec{\omega}$ as shown below:

$$\vec{W_R}=\vec{P_R}+\vec{\omega}$$

B. Warp Vector Calculation

It might seem a little counter-intuitive that a simple addition to RSS vector can change the way faces are shaped and organized. In this section, we explain how warp vector is calculated and the underlying reasoning why warping reorganizes the SBL faces. The warp vector is a n-dimensional vector where each component corresponds to a warp factor associated with an individual beacon node. Warp factor is the transmitter specific bias value that needs to be added to the RSS value, it is uniquely calculated for each beacon node. This is done only once for a given topology and localization space, it is then stored and used again and again every time the localization algorithm is invoked by a target node. Calculation of warp vector is a two-step process.

Figure 4A:
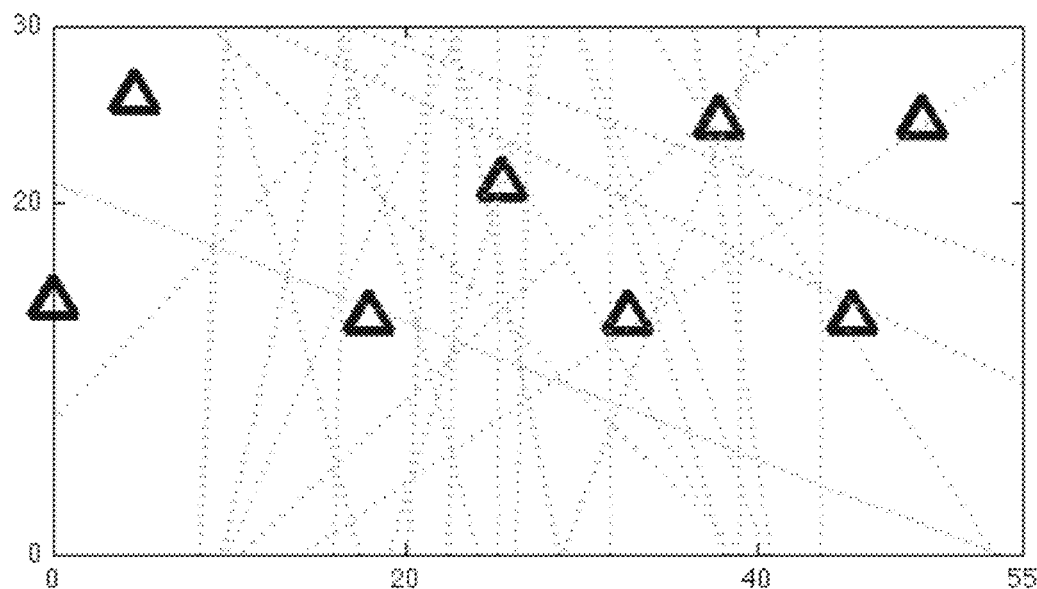
FIGS. 4A and 4B. Warping (A) Equal RSS lines in case of SBL and corresponding faces. (B) Warped Equal RSS lines: Effect of adding a warp vector.
Figure 4B:
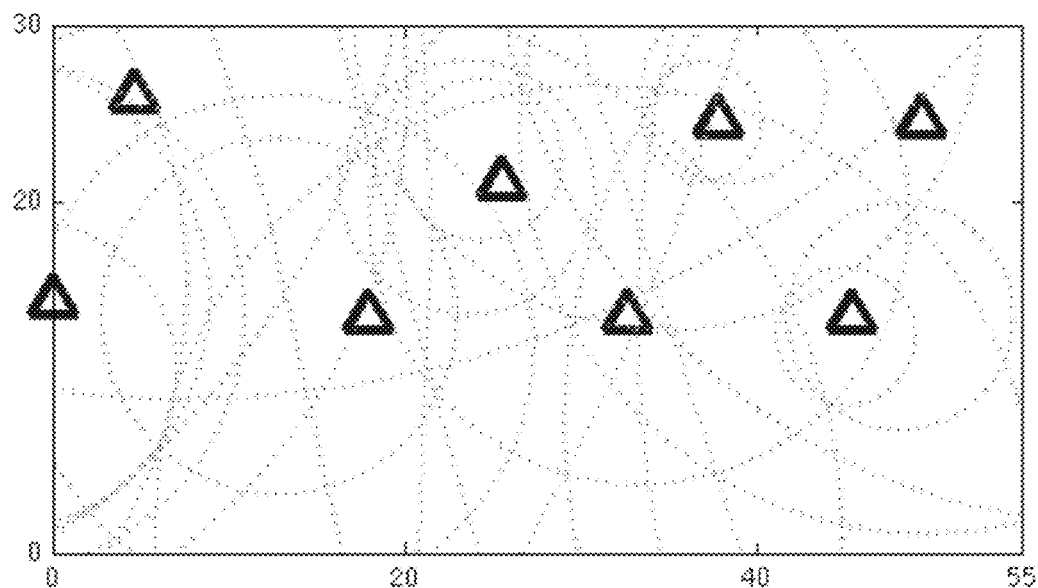
Figure 5A:
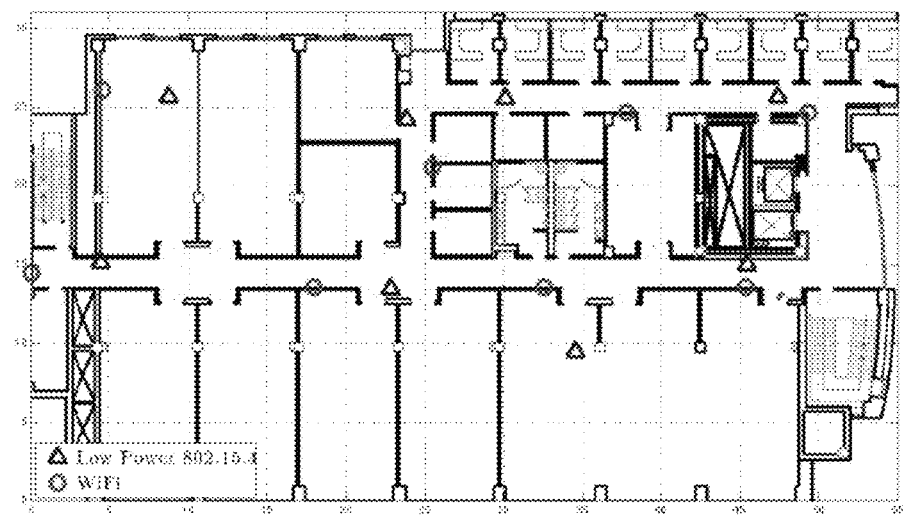
FIGS. 5A and 5B. System Overview (A) Network Topology. (B) System Architecture.

First, for a given topology of beacon nodes an optimized transmit power vector is calculated such that it minimizes the area of the largest SBL face. For a given topology the way SBL faces are organized only depends upon the difference in transmit power of beacon nodes [9]. SBL assumes equal transmit power for all beacon nodes. This results in equal RSS curves being straight lines which are eventually responsible for the shape of the faces. Changing the transmit power of the beacon nodes reshapes these curves into circles. Every pair of beacon nodes generates an equal RSS circle whose radius and center depends upon the difference in beacon node transmit powers [9]. This means that if it was possible to change the transmit power of the beacon nodes and set it to a desired optimum value, the SBL faces could be reorganized such that the size of the largest face is minimized which in turn organizes the faces uniformly. This is shown in FIG. 4, where FIG. 5(A) shows faces when all the beacon nodes transmit at equal power and FIG. 4(B) shows the faces when the nodes are transmitting at their respective transmit power. As mentioned earlier when using an existing WIFI infrastructure as the beacon nodes are making changes to the transmit power is generally not possible.

For n beacon nodes with $\vec{P_T}$ transmit power vector in a predefined topology, we can define an optimization problem as follows.

$$\underset{X}{\text{Minimize }} Ma(\vec{P_T})$$

$$\text{Subject to } \vec{P_T} > 0:$$

Where $M_a(\vec{P_T})$ is a function that returns the Max-Area value for the n beacon nodes with $\vec{P_T}$ transmit power vector. The function $M_a(\vec{P_T})$ captures a very complex relationship between the transmit power of the beacon nodes and uniformity of the SBL faces and is very difficult to express mathematically but it is possible to evaluate its value empirically. As the above defined optimization problem is not a convex problem, we resort to Simulated Annealing [10] to find a near-optimal solution. The optimized transmit power vector $\vec{P_T}$ is not directly implemented on the beacons, but rather used to calculate the warp vector which is implemented as a mathematical transformation as described below.

Calculation of the warp vector from the optimized transmit power vector $\vec{P_T}$ is based on two simple observations. First, there is a linear relationship between transmit power and received power given by the path loss model. Second, the path loss and fading is independent of the transmit power value. So, at any instant of time t if $\Delta_{p,q,t}$ is the gain on the signal due to fading on its way from beacon node p to target q then for any value of transmit power $P_{Tp}$ we can say the following $$P_{Rpqt} = R_{Tp} + P_{d0} - 10\eta \log\left(\frac{d}{do}\right) + \Delta_{p,q,t}$$

where $P_{rpqt}$ is the signal strength received by q from p at time t. To calculate the RSS at q if the beacon node p was transmitting at a different $P'_{Tp}$ instead of $P_{Tp}$ we can do a simple transformation as shown by the following equation:

$$P'_{Rpqt} = P_{Rpqt} + (P'_{Tp} - P_{Tp})$$

Hence, we can observe RSS value for a pre-set transmit power and transform it into RSS values for any other transmit power. The warp vector is given by the difference of the optimal power vector and the actual transmit power vector. Warp factor is only applied for the beacon nodes whose beacon packets are received.

$$\vec{\omega} = \vec{P_T}^* - \vec{P_{T0}}$$

Warping essentially achieves the same results that beacon nodes transmitting at optimized power would; it reshapes and reorganizes the SBL faces to minimize the area of the largest face. However, it does so without changing the transmit powers of the beacon nodes, allowing it to be easily implemented with legacy access points and with low complexity.

C. Localization Using Warped RSS

Sequence based localization using warped-RSS vector is almost the same as sequence based localization using the RSS vector except for one key difference. SBL doesn't use transmit power to generate the sequence-centroid table whereas WR-SBL uses optimized transmit power vector (corresponding to the original power vector plus the derived warp vector) to generate the sequence-centroid table. This table is at the heart of sequence based localization; every incoming ranked-RSS vector (incoming sequence) is compared against the ones stored in this table. Face centroid coordinates corresponding to the sequence with highest match are determined and returned as the localization output.

2. WR-SBL SYSTEM IMPLEMENTATION

We have implemented WR-SBL on two platforms: Android Smartphones which use IEEE 802.11 (WIFI) and Tmote-Sky devices which use IEEE 802.15.4. The two implementations are separate stand-alone systems. The back-end server for both systems runs the same algorithm but uses different locations for the beacons corresponding to the respective network topologies.

1) Android Smartphone: We implemented an android app which can periodically gather RSS information for all the neighboring WIFI access points and sends it to the server in a vector form. With this app on, a smartphone starts behaving like a target node. WIFI access point infrastructure shown in FIG. 5(A) is similar to a building WIFI infrastructure without any modification. The smartphones communicate with the server over the Internet to send and receive RSS and location data. Once the request with RSS data reaches the server, it identifies the target node by its MAC address, runs the localization algorithm and sends back the location estimate to the target node.

2) Tmote-Sky: The Tmote-Sky based low-power wireless system consists of target nodes and multiple beacon nodes FIG. 5(A). The 18 low-power beacon nodes used in this document are part of a permanent indoor testbed installation. Tmote-Sky motes use the IEEE 802.15.4-based CC2420 radio chip [11] with maximum transmit power of 0dBm. We use TinyOS to program the Tmotes. Each beacon node is programmed to broadcast beacons periodically (every second). On receiving these beacons, target node which is connected to a laptop forwards the RSS vector to the localization server via the host laptop for further processing and localization.

Figure 5B:
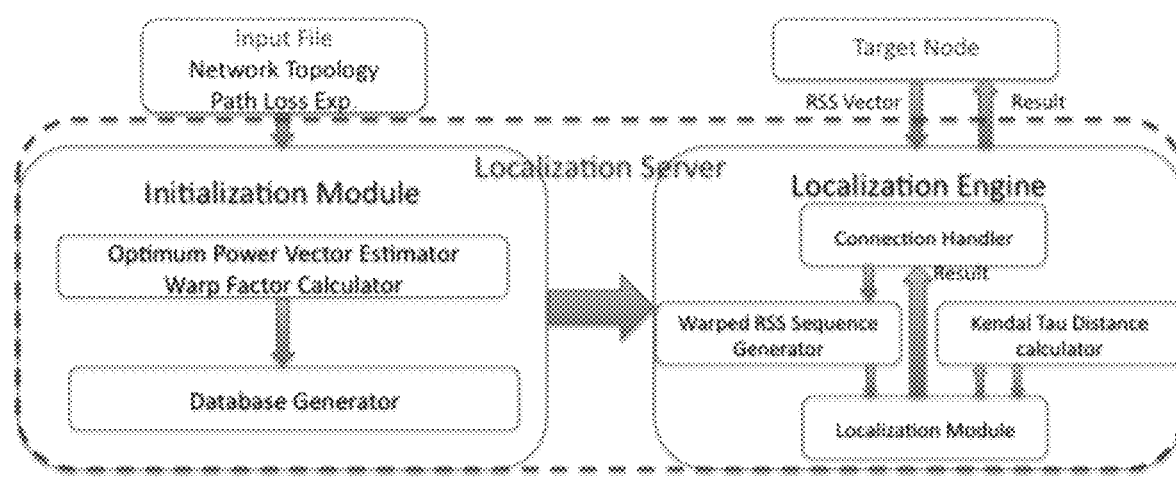

3) Localization Server: Localization server implementation is done in Java. It is responsible for (a) receiving the RSS vectors from the target nodes, (b) running the localization algorithm, (c) logging the results along with the RSS vector and (d) returning the results back to the target node. The localization server consists of two main modules: Initialization module and Localization Engine as shown in FIG. 5(B). For evaluation and experimentation purposes, it is also capable of running Maximum Likelihood Estimation (MLE) and Sequence Based Localization (SBL) algorithms. The Initialization Module only needs to execute once and then the control is transferred to the localization engine.

Initialization module requires three inputs: beacon node network topology, localization space dimensions and path loss exponent. Once it has populated the database, it hands over the control to the localization engine which is then responsible for running the algorithm. The connection handler module uses TCP/IP ports to communicate with the target nodes.

A. WR-SBL Algorithm

The implementation of WR-SBL algorithm is simple, and its pseudocode is described in FIG. 7A. As described in the earlier sections WR-SBL computes warp vector $\vec{\omega}$ during the initialization phase. On reception of RSS vector, localization module performs a warp transformation to obtain warped RSS vector $\overrightarrow{\omega RSS}$ which is used to derive a sequence vector $\vec{seq}$. During the initialization phase, a Sequence Centroid Table T is generated using $\vec{P_T}$ and beacon node topology S. Sequence centroid table maps ideal sequences to the centroid of the corresponding faces. Table T contains all the valid sequences and corresponding centroids based on path loss model. Every received RSS ranked sequence $\vec{seq}$ is compared against every entry of T using Kendal Tau correlation coefficient as a metric. The centroid corresponding to the best matched sequence is given out as the location estimate.

B. Enhanced WR-SBL Algorithm

After implementing WR-SBL algorithm, we further improved on it to obtain an Enhanced-WR-SBL (EW-SBL). The idea of EW-SBL is simple: instead of finding just one set of optimum power vector, warp vector $(\vec{P_T}^*, \vec{\omega})$ for the entire localization space, an optimum power vector, warp vector $(\vec{P_{T_{ij}}}^*, \vec{\omega} 1 J)$ is calculated for every zone $Z_{ij}$ defined by its centroid (i, j). Each zone is a square of side d and the entire localization space is divided in multiple zones forming a grid as shown in FIG. 5(A). Therefore, EW-SBL has multiple sequence centroid tables one for each zone as shown in FIG. 6. To do localization,m the algorithm first needs to pick a zone and then use corresponding warp vector and sequence centroid table to localize the target node more precisely. Selecting a zone is like doing a coarse grain localization and zones can be switched just by changing the warp vector. Zone can be selected based on the estimated location estimated in previous time slot or by first using another algorithm like SBL or WR-SBL in the same time slot. User moving from one zone to other is not an issue because there is a complete overlap between the neighboring zones which facilitates the transition.

With reference to the EW-SBL pseudocode depicted in FIG. 7B, after initialization the localization is performed in two steps. First, for an incoming RSS vector at time t if the location of requesting target node at time t−1 seconds is not known then the WRSBL algorithm is executed to find a location estimate (x, y) of the target node, this estimate is then used to pick a zone $Z_{ij}$ such that, distance from selected zone's centroid (i, j) to (x, y) is minimum $\forall$(i, j). Else, if the location from the previous time slot is known, it picks a zone which minimizes the distance from a zone's centroid to ($x_{old}$, $y_{old}$) (location estimate from the previous time slot). The second step involves running WR-SBL using the selected zone's warp vector and database (sequence centroid table) and finding the final location estimate.

C. Evaluation and Experimentation

This section presents the evaluation procedure and details about the real-world experiments. First, we discuss some inherent sources of error for a real-world deployment. Then we describe key features of the indoor environment where the experiments were conducted and finally, we discuss the results.

1) Sources of Error: SBL estimates the location by mapping a sequence to a face. The co-ordinates of this face's centroid are returned as the result. Even in ideal conditions this approximation can significantly add to the error. Hence, it is important to have every region of approximately the same size. This is where the warping helps reduce the error and gives a substantial benefit.

It is noted that the path loss model considered to generate the sequence centroid table doesn't take walls and other obstacles into account. This can be considered in a richer propagation model. The major source of error is due to the random errors in RSS measurements which can be contributed to multipath fading effects of the RF channel.

2) Indoor Experiment Environment and Methodology: All the experiments were conducted on the fourth floor of an office and research facility. FIG. 5(A) shows the floor plan of the entire localization space, which is 55 m×30 m in area. During regular office hours, there are an average of 60 to 70 people present in this space.

The experiments were carried out between 10:00 AM to 11:00 AM on a regular office day. Experiments were carried out to evaluate the performance of the algorithm in localizing a user at 18 different randomly selected locations using the low power IEEE 802.15.4-based system and 12 different randomly selected locations using WIFI system. The ground truth about the user's position was precisely measured in terms of x-y coordinates. At every location, readings were taken periodically (every second) for approximately 60 seconds. Experiments for the low-power wireless testbed and WIFI testbed were conducted separately. The low-power wireless beacon nodes are a part of a permanently deployed testbed and are located above the false ceiling along with the ventilation ducts and other cables whereas WIFI access points are openly deployed in the hallways.

D. Evaluation Results

1) Node Density versus Localization Error: We first substantiate our simulation results presented in the Introduction Section through the real experimental data. For this we use the WSN testbed and vary the total number of deployed beacon nodes and estimated the localization error at 18 randomly selected target node locations. We did 5 such set of experiments.

Figure 8:
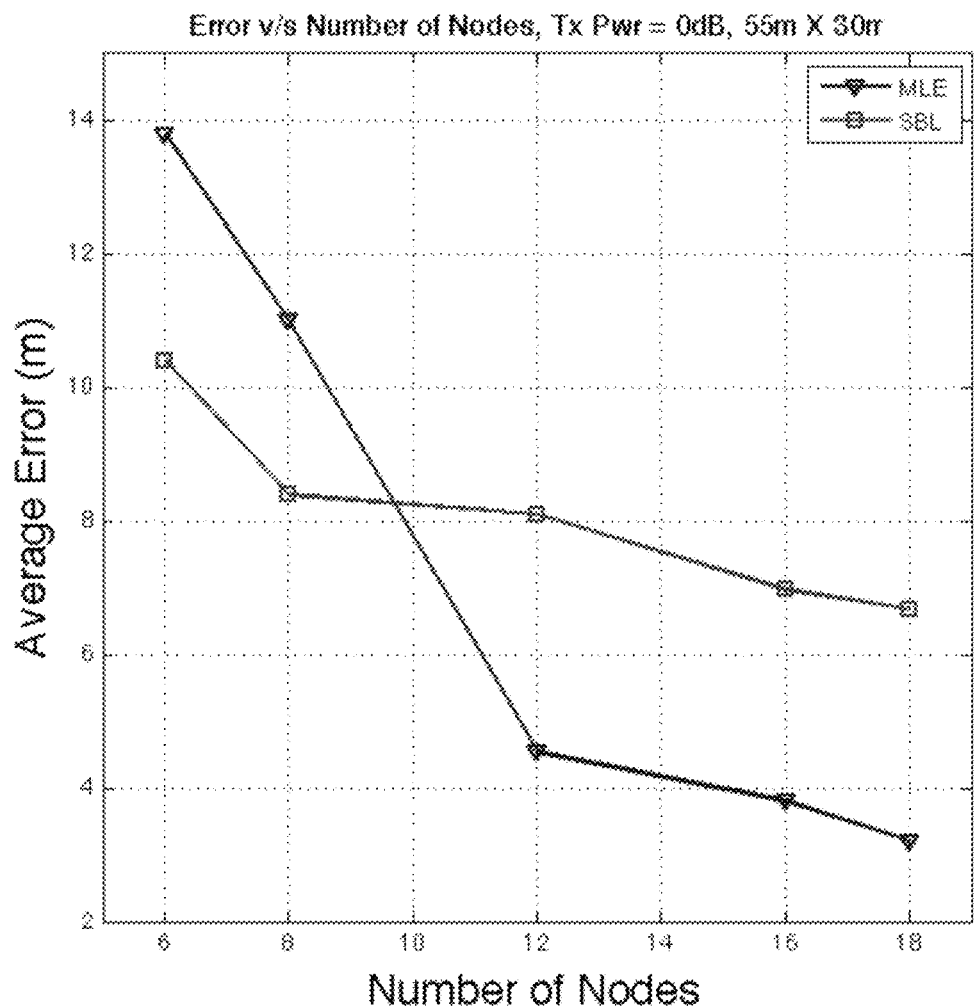
FIG. 8. Testbed results: Node density vs Localization Error for original SBL versus MLE. The proposed algorithms aim to improve upon SBL performance even further, which this figure indicates would be good especially for sparse and moderately dense beacon deployments.

For every deployment, we took multiple readings at every target node location and combined them to calculate the average error across the entire localization space and FIG. 8 shows that for SBL and MLE as the beacon node density increases the localization error reduces and that MLE does better than SBL at high densities, but poorly at lower densities. As mentioned in the introduction, this work is motivated by the need to develop effective localization solutions for environments without high density of beacons, and the improvements we propose to SBL will be a contribution for such settings.

2) Estimating Path Loss Exponent: The path Loss exponent is one of the key parameter that needs to be evaluated for MLE, WR-SBL and EW-SBL algorithms. Estimation of value was done using data which was collected from multiple stationary target nodes at multiple locations in the localization space. We performed a linear regression on this set of data to find the value of $\eta$. This was done while keeping KdB for d0=1 m fixed to the value evaluated experimentally. The value of $\eta$ for WIFI was estimated to be 2.26 and the one for the IEEE 802.15.4-based low-power testbed was 2.2, which are very typical for indoor environments as reported by [12]. Other than η estimate, MLE also requires RSS variance estimate for the environment so using the same data set we estimated the variance to be equal to 20 dB.

$$P_R = P_T - K_{dB} - 10\eta \log\left(\frac{d}{do}\right)$$

Figure 9A:
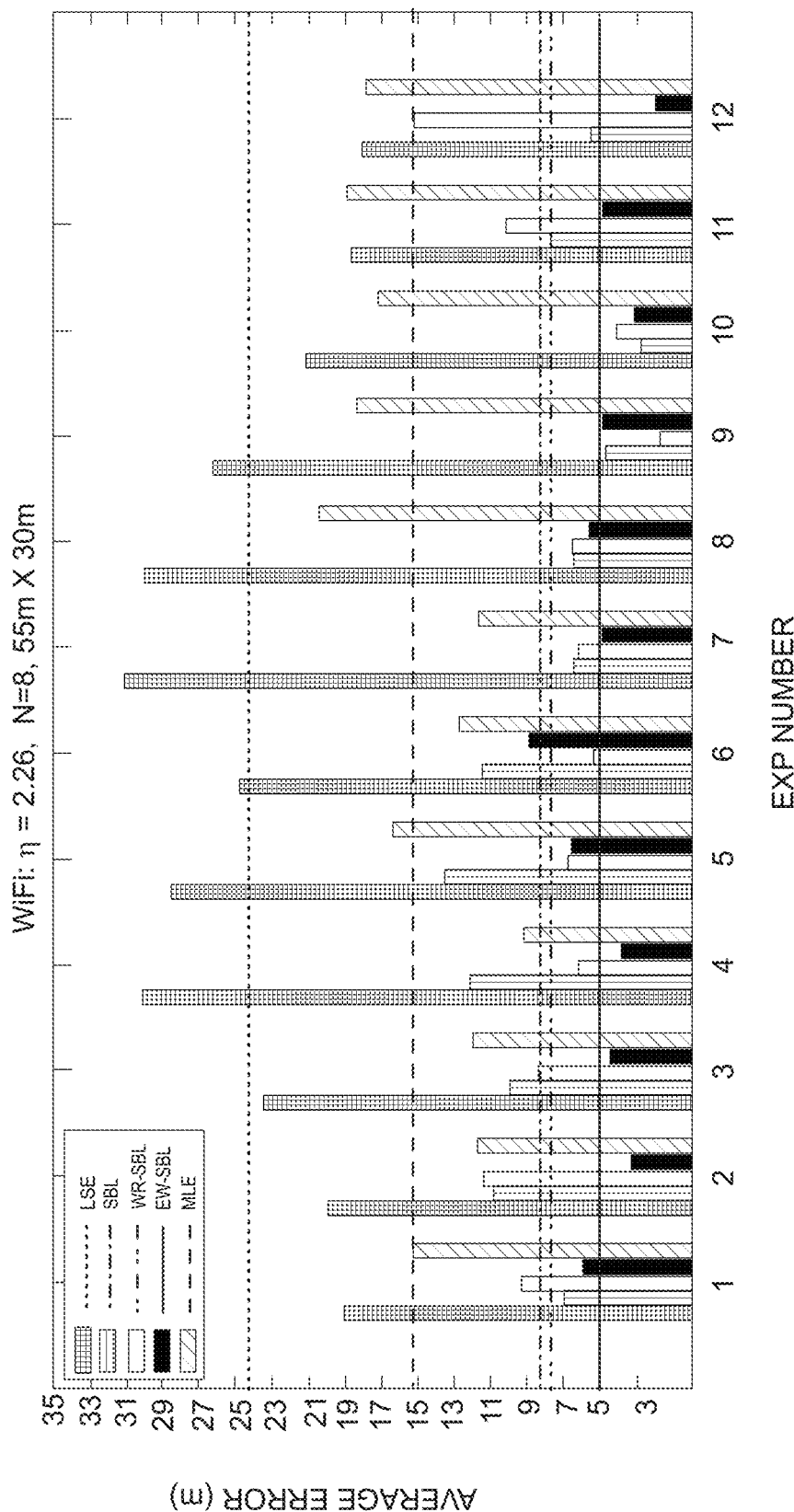
FIGS. 9A and 9B. WIFI Testbed Results with 8 beacon nodes (A) Average Error (B) Error Cdf.
Figure 9B:
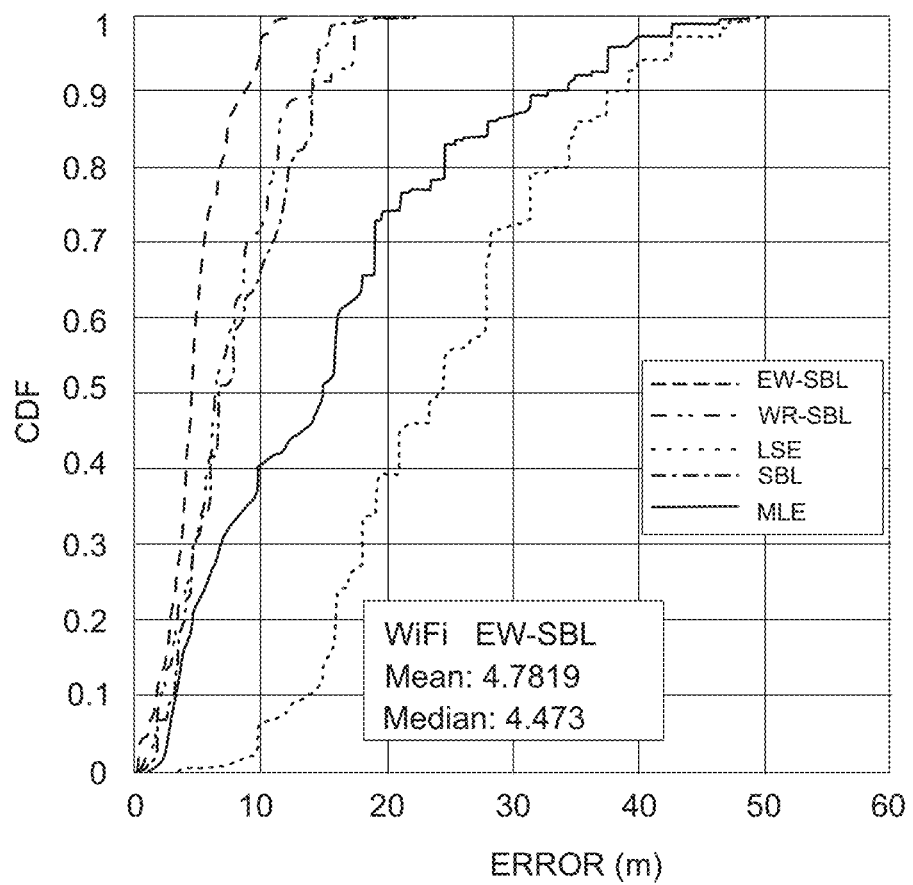

3) WIFI Results: Evaluation results FIG. 9(A) for Android smartphones and 8 WIFI access points (beacon nodes) based system shows that the WR-SBL and EW-SBL algorithm outperform all the other algorithms for this low deployment density network. In terms of the average distance error, LSE turns out to be the worst of all, and WR-SBL shows improvement over the SBL. EW-SBL algorithm is even better, showing a 45% improvement over SBL, and gives 3-fold better results than MLE. FIG. 9(B) shows the cumulative distribution of the error. The median is lower than the mean meaning more than 50% of the time the error is less than the average distance error.

Figure 10A:
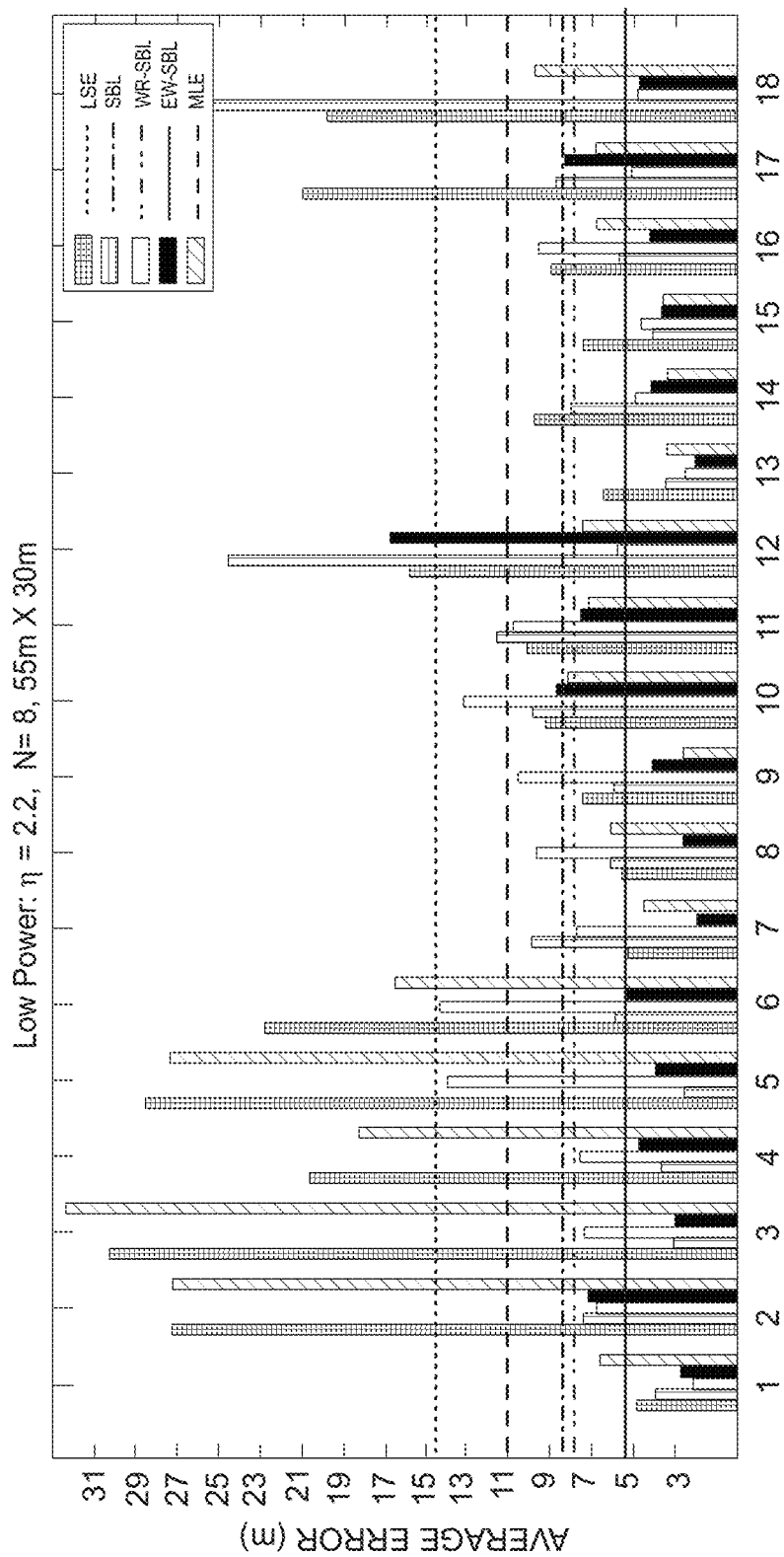
FIGS. 10A and 10B. Low-power 802.15.4 radio-based realistic network results with 8 beacon nodes (A) Average Error (B) Error Cdf.
Figure 10B:
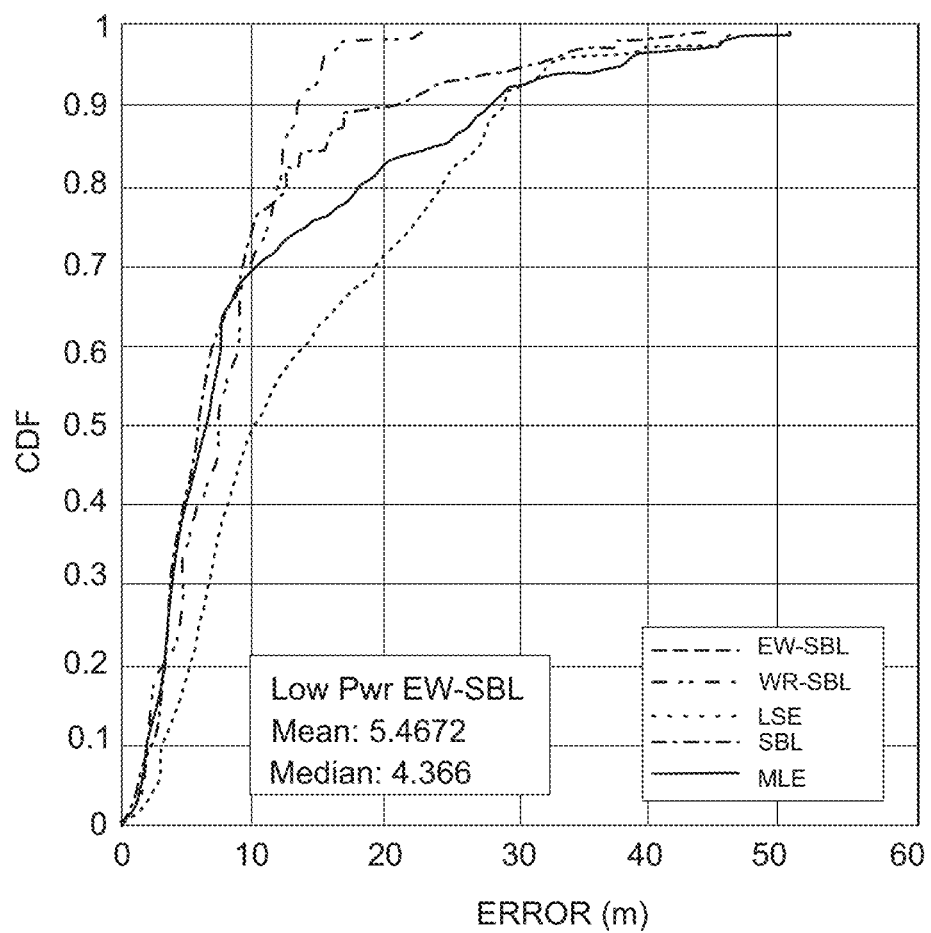

4) Low-Power Wireless Testbed Results: For the low power IEEE 802.15.4-based wireless testbed system we evaluated our algorithms for two different network topologies. First one is a moderately dense (realistic) topology with 8 beacon nodes and a second denser topology with 18 beacon nodes. FIG. 10(A) shows results for the moderate topology.

The bar graph shows how each algorithm compares for each set of experiments and the horizontal lines show the average error for all the experiments combined. As expected, SBL performs better then MLE [5], WR-SBL shows a little improvement over SBL but not a lot. The real gain is achieved by EW-SBL algorithm. It reduces the error dramatically across all experiments, showing about a factor of 2 improvement over MLE, and more than 40% improvement over the original SBL.

Figure 11A:
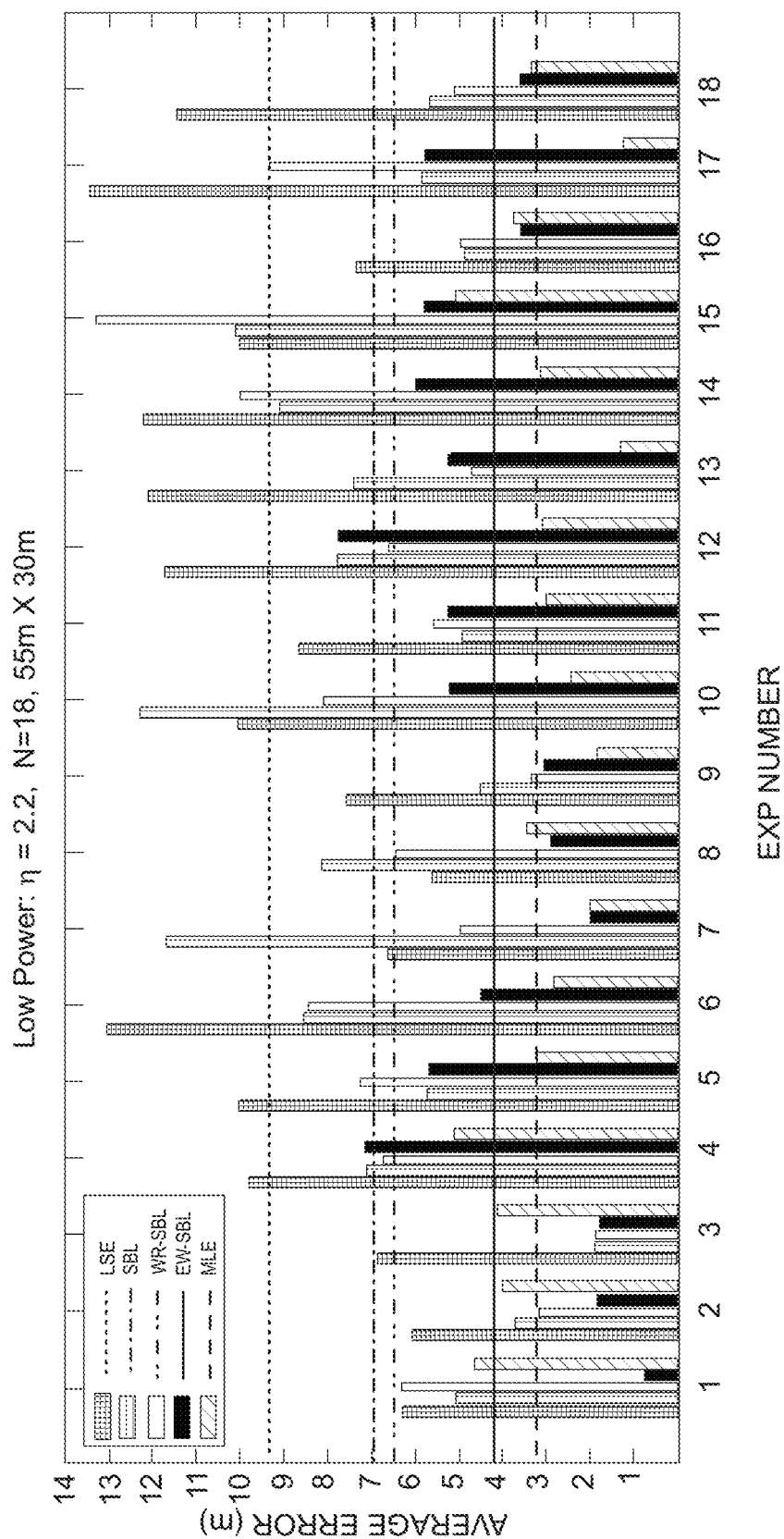
FIGS. 11A and 11B. Low-power 802.15.4 radio-based Dense Network Results with 18 beacon nodes (A) Average Error (B) Error Cdf.
Figure 11B:
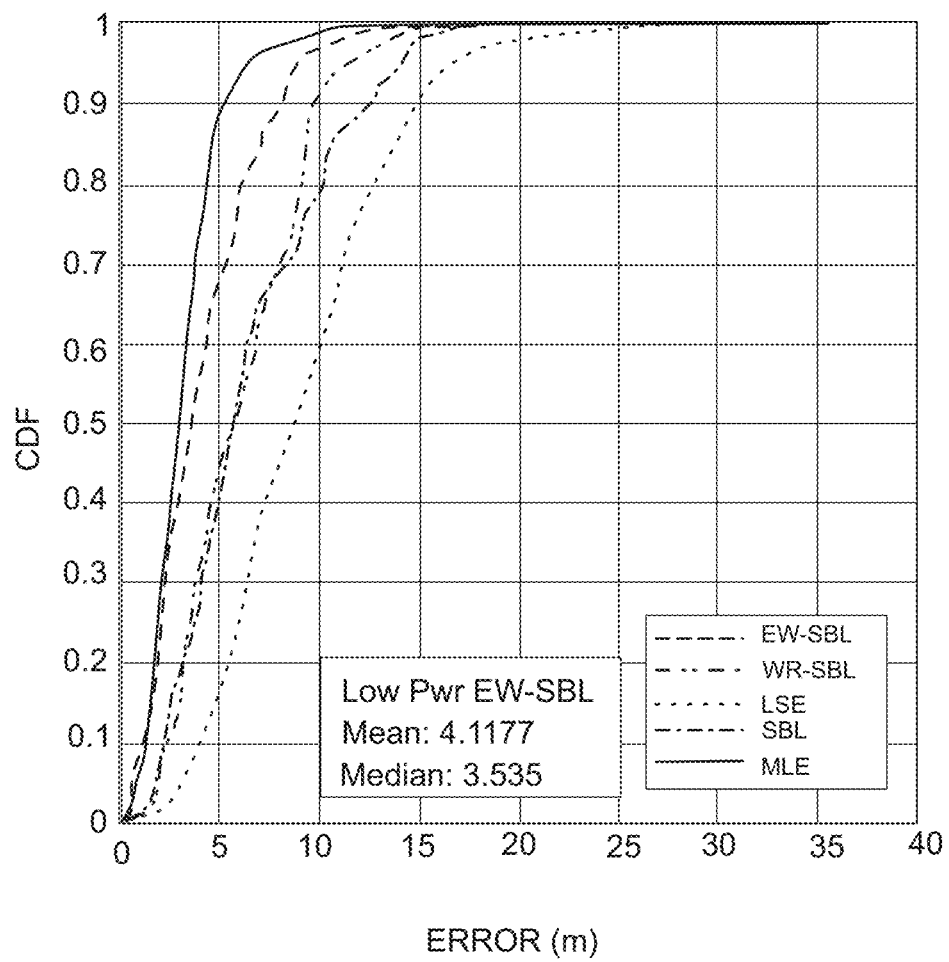

For the dense topology case with 18 nodes as shown in FIG. 11(A) we see, as anticipated, that MLE shows the best performance, out-performing EW-SBL as well as all the other schemes. However, it should be noted that EW-SBL shows more than a factor of 2 improvement over traditional SBL, and offers relatively more competitive performance to MLE (about 30% higher average error) than other algorithms compared, even in this highly dense beacon setting. LSE performs the worst even for this setting.

3. RELATED WORK

RSS based localization techniques have dominated the field of indoor localization over the time of arrival [13] [14], angle of arrival [15] and radio interferometry [16] [17] based techniques. This is because of ease of implementation (less strict requirements about hardware capability and synchronization) as well as because the non-RSS based techniques suffer from multipath effect, which may seriously alter the time and angle of arrival of the signal, hence adversely affecting the localization accuracy. Ultra-wideband based schemes mitigate these issues by using more sophisticated transceivers to achieve fine-grained global time synchronization, and consequently increasing the hardware cost and complexity. This prevents them from being deployed easily using consumer radio platforms such as mobile phones and low power wireless sensors. Radio interferometry [16] [18] works best in line of sight settings and has a very complex implementation. It also requires tight synchronization between the nodes, which can be computationally very demanding as it requires complex signal processing.

There are a multitude of techniques like proximity [19], fingerprinting [3] and classical estimation theory based schemes [2] [1] which use RSS measurements for localization. Fingerprinting techniques like RADAR [3] and LANDMARC [4] select k known locations whose RSS signature are already known and are closest to the one obtained by the target node. Then it combines these k known locations to give the localization output. Classical estimation theory based techniques such as LSE [2] and MLE [1] require path loss exponent and variance estimation.

Sequence Based Localization (SBL) was designed and introduced by Yedavalli et al. [6] [5] as a localization algorithm which is more robust, easy to deploy and better in performance. The reason for this is because SBL is independent of any path loss parameters and doesn't require any prior training or model estimation. It has a low time complexity making it an attractive choice for doing RSS based localization. This is substantiated by the work done by B. J. Dil et al. [20], they empirically compare finger-printing, MLE and SBL under different antenna orientation and calibration settings. Demonstrating that SBL can outperform the other approaches in an uncalibrated, dynamically-varying realistic environment. SBL is also very useful in emergency response operations where the localization system needs to be deployed rapidly [21]. In another system implementation [22], the authors demonstrate how using a series of sequences can be used to improve tracking.

One of the other variants of SBL which is relevant to this work proposes to use non-uniform transmit power levels for the beacon nodes [9]. This algorithm works on the basic idea that if the beacon nodes can be tuned to transmit at different power, optimizing the transmit power vector offers a degree of freedom in the design to reduce the localization error. It also shows that optimizing over the location of the beacon nodes can be used to improve the localization accuracy, and also proposes a zoom technique to further improve the algorithm's accuracy. The practical implementation of their algorithm and its zoom variant would require a control over the reference node power settings. From a practical standpoint, this might not be possible when using an existing WIFI access point infrastructure. Another drawback is that the localization accuracy outside the zoom area suffers dramatically. Hence it could be unfair to some users and making it work for multiple users could be tricky. In contrast, the techniques proposed in our work can be implemented easily in software and can be used to handle the localization of any number of users.

Recent research has shown that incorporating data from other sensors on a smartphone can further improve the RSS based localization accuracy [23], [24]. Works along these lines are orthogonal and complementary to the improvements that we have demonstrated in this work.

6. CONCLUSIONS

Embodiments set forth herein address the problem of improving radio signal strength-based localization performance in environments with a sparse to moderately-dense (realistic) deployment of beacon nodes. We found through simulations and experiments that the widely used MLE algorithm for RSS localization performs poorly in such settings compared to sequence-based localization (this is a new observation as previous works have not compared the two approaches as a function of beacon density). Motivated by this observation, we set out to further improve SBL performance. We introduced a new technique for SBL called WR-SBL, in which received signal strength vectors from the different beacons are modified by adding to them a warp vector (carefully designed using an optimization formulation solved by simulated annealing to minimize the area of the largest face corresponding to a location sequence.) We further improved it to obtain the EW-SBL by generating different warp vectors for different regions of the localization space. Our experiments on a real WIFI and WSN testbed show that for moderate density (8 nodes in a 55 m×30 m space) this technique significantly outperforms previous known algorithms including the original SBL, MLE, and LSE. On a much denser deployment (18 nodes in 55 m×30 m space), MLE is indeed still better, but the proposed novel algorithm still offers significant improvements over traditional SBL.

A hybrid localization algorithm could be designed to combine the best aspects of MLE and EW-SBL to provide efficient tunable performance across a wide range of beacon deployments, from sparse to dense.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] A. Waadt, C. Kocks, S. Wang, G. Bruck, and P. Jung, "Maximum likelihood localization estimation based on received signal strength," in *Applied Sciences in Biomedical and Communication Technologies (ISABEL)*, 2010 3rd International Symposium on, November 2010, pp. 1-5.

[2] A. Savvides, C.-C. Han, and M. B. Strivastava, "Dynamic fine-grained localization in ad-hoc networks of sensors," in Proceedings of the 7th Annual International Conference on Mobile Computing and Networking, ser. MobiCom '01. New York, N.Y., USA: ACM, 2001, pp. 166-179.

[3] P. Bahl and V. Padmanabhan, "Radar: an in-building rf-based user location and tracking system," in *INFOCOM 2000. Nineteenth Annual Joint Conference of the IEEE Computer and Communications Societies. Proceedings. IEEE*, vol. 2, 2000, pp. 775-784 vol. 2.

[4] L. Ni, Y. Liu, Y. C. Lau, and A. Patil, "Landmarc: indoor location sensing using active rfid," in *Pervasive Computing and Communications, 2003. (PerCom 2003). Proceedings of the First IEEE International Conference on*, March 2003, pp. 407-415.

[5] K. Yedavalli and B. Krishnamachari, "Sequence-based localization in wireless sensor networks," *Mobile Computing, IEEE Transactions on*, vol. 7, no. 1, pp. 81-94, January 2008.

[6] K. Yedavalli, B. Krishnamachari, S. Ravula, and B. Srinivasan, "Ecolocation: A sequence based technique for rf localization in wireless sensor networks," in *In Proceedings of the Fourth International Symposium on Information Processing in Sensor Networks (IPSN.* Inc, 2005, pp. 285-292.

[7] X. Sheng and Y.-H. Hu, "Maximum likelihood multiple-source localization using acoustic energy measurements with wireless sensor networks," *Signal Processing, IEEE Transactions on*, vol. 53, no. 1, pp. 44-53, January 2005.

[8] A. Goldsmith, *Wireless communications*. Cambridge university press, 2005.

[9] Anonymous, "Anonymized to preserve double-blind review process."

[10] A. E. van Laarhoven, P. J., *Simulated Annealing: Theory and Applications (Mathematics and Its Applications)*. Springer, 1987.

[11] Moteiv, Tmote Sky Datasheet http://www.sentilla.com/pdf/eol/tmote-sky-datasheet.pdf, 2006.

[12] E. Tanghe, W. Joseph, L. Verloock, L. Martens, H. Capoen, K. Van Her-wegen, and W. Vantomme, "The industrial indoor channel: large-scale and temporal fading at 900, 2400, and 5200 mhz," *Wireless Communications, IEEE Transactions on*, vol. 7, no. 7, pp. 2740-2751, July 2008.

[13] S. Gezici, Z. Tian, G. Giannakis, H. Kobayashi, A. Molisch, H. Poor, and Z. Sahinoglu, "Localization via ultra-wideband radios: a look at positioning aspects for future sensor networks," *Signal Processing Magazine, IEEE*, vol. 22, no. 4, pp. 70-84, July 2005.

[14] R. Fontana, E. Richley, and J. Barney, "Commercialization of an ultra wideband precision asset location system," in *Ultra Wideband Systems and Technologies, 2003 IEEE Conference on*, November 2003, pp. 369-373.

[15] B. Van Veen and K. Buckley, "Beamforming: a versatile approach to spatial filtering," *ASSP Magazine, IEEE*, vol. 5, no. 2, pp. 4-24, April 1988.

[16] M. Maroti, P. Vo'lgyesi, S. Dora, B. Kusy', A. Nádas, A. Lédeczi, G. Balogh, and K. Molna'r, "Radio interferometric geolocation," in *Proceedings of the 3rd International Conference on Embedded Networked Sensor Systems*, ser. SenSys '05. New York, N.Y., USA: ACM, 2005, pp. 1-12.

[17] K. Pahlavan, X. Li, and J.-P. Makela, "Indoor geolocation science and technology," *Communications Magazine, IEEE*, vol. 40, no. 2, pp. 112-118, February 2002.

[18] B. J. Dil and P. J. M. Havinga, "Stochastic radio interferometric positioning in the 2.4 ghz range," in *Proceedings of the 9th ACM Conference on Embedded Netw orked Sensor Systems*, ser. SenSys '11. New York, N.Y., USA: ACM, 2011, pp. 108-120.

[19] N. Patwari and A. O. Hero, III, "Using proximity and quantized rss for sensor localization in wireless networks," in *Proceedings of the 2Nd ACM International Conference on Wireless Sensor Networks and Applications*, ser. WSNA '03. New York, N.Y., USA: ACM, 2003, pp. 20-29.

[20] B. J. Dil and P. J. M. Havinga, "Rss-based localization with different antenna orientations," in *Telecommunication Networks and Applications Conference (ATNAC)*, 2010 *Australasian*, October 2010, pp. 13-18.

[21] N. Li, B. Becerik-Gerber, B. Krishnamachari, and L. Soibelman, *An Environment-Aware Sequence-Based Localization Algorithm for Supporting Building Emergency Response Operations*, ch. 69, pp. 549-556.

[22] Z. Zhong, T. Zhu, D. Wang, and T. He, "Tracking with unreliable node sequences," in *INFOCOM 2009, IEEE*, April 2009, pp. 1215-1223.

[23] A. Rai, K. K. Chintalapudi, V. N. Padmanabhan, and R. Sen, "Zee: Zero-effort crowdsourcing for indoor localization," in *Proceedings of the 18th Annual International Conference on Mobile Computing and Networking*, ser. Mobicom '12. New York, N.Y., USA: ACM, 2012, pp. 293-304.

[24] C. Luo, H. Hande, and M. C. Chan, "Piloc: a self-calibrating participatory indoor localization system," in *IPSN*, 2014.

What is claimed is:

1. A method for localizing a mobile device in a physical space, the method comprising:
   a) generating one or more received signal strength vectors from wireless signals exchanged between a plurality of fixed nodes and one or more mobile devices to be located, each received signal strength vector providing relative signal strengths between one of the one or more mobile devices and each of the fixed nodes, the plurality of fixed nodes defining initial Sequence Based Localization (SBL) faces in a physical localization space having an initial largest SBL face;
   b) transforming each received signal strength vector of the one or more received signal strength vectors to form a plurality of transformed signal strength vectors such that transformed SBL faces have a largest transformed SBL face that is reduced compared to the initial largest SBL face, wherein the transforming comprises adding a warp vector to each received signal strength vector, the warp vector being a difference of an optimal transmit power vector and an actual transmit power vector; and
   c) determining a location for each of the one or more mobile devices from the plurality of transformed signal strength vectors.

2. The method of claim 1 wherein one or more of steps a), b) and c) are performed by the one or more mobile devices.

3. The method of claim 1 wherein one or more of steps a), b) and c) are performed by the fixed nodes.

4. The method of claim 1 wherein one or more of steps a), b) and c) are performed by a server in communication with the plurality of fixed nodes.

5. The method of claim 1 wherein the wireless signals are generated by transmitting sets of beacon packets that are received by the one or more mobile devices wherein the fixed nodes are beacon nodes.

6. The method of claim 5 wherein each set of beacon packets is transmitted with an original power such that a vector of transmitted powers is defined, the largest transformed SBL face being minimized by finding the optimal transmit power vector.

7. The method of claim 1 wherein the largest transformed SBL face is minimized by combinatorial optimization.

8. The method of claim 1 further comprising generating a sequence-centroid table from the optimal transmit power vector corresponding to the actual transmit power vector plus the warp vector, the sequence-centroid table comprising a plurality of sequences with a corresponding centroid position.

9. The method of claim 8 wherein the one or more received signal strength vectors include attenuation from path loss and fading.

10. The method of claim 8 wherein localization is determined by finding a best match sequence in the sequence-centroid table to the received signal strength vector.

11. The method of claim 1, further comprising:
   dividing physical space into a plurality of pre-defined zones;
   determining an optimum power vector and an optimal warp vector for each zone of the plurality of pre-defined zones to form a plurality of multiple sequence-centroid tables and a plurality of warp vectors;
   determining a current zone in which a target node is located;
   selecting one warp vector to transform each received signal strength vector at the target node present in the current zone; and
   localizing the target node by finding a best match sequence in a sequence-centroid table for the current zone.

12. A system for localizing a mobile device in a physical space, the system comprising:
   one or more mobile devices to be located;
   a plurality of fixed nodes that define initial Sequence Based Localization (SBL) faces in a physical localization space having an initial largest SBL face; and
   a server in communication with the plurality of fixed nodes, wherein at least one of the one or more mobile devices, fixed nodes, or the server is configured to:
   generate one or more received signal strength vectors from wireless signals exchanged between the plurality of fixed nodes and the one or more mobile devices to be located, each received signal strength vector providing relative signal strengths between one of the one or more mobile devices and each of the fixed nodes;
   transform each received signal strength vector of the one or more received signal strength vectors to form a plurality of transformed signal strength vectors such that transformed SBL faces have a largest transformed SBL face that is reduced compared to the initial largest SBL face; and
   determine a location for each of the one or more mobile devices from the plurality of transformed signal strength vectors, wherein each received signal strength vector is transformed by adding a warp vector to each received signal strength vector, the warp vector being a difference of an optimal transmit power vector and an actual transmit power vector.

13. The system of claim 12 wherein the wireless signals are generated by transmitting sets of beacon packets that are received by the one or more mobile devices wherein the fixed nodes are beacon nodes.

14. The system of claim 12 wherein each set of beacon packets is transmitted with an original power such that a vector of transmitted powers is defined, the largest transformed SBL face being minimized by finding the optimal transmit power vector.

15. The system of claim 12 wherein the largest transformed SBL face is minimized by combinatorial optimization.

16. The system of claim 12 wherein at least one of the one or more mobile devices, fixed nodes, or the server is configured to generate a sequence-centroid table from the optimal transmit power vector corresponding to the actual transmit power vector plus the warp vector, the sequence-centroid table comprising a plurality of sequences with a corresponding centroid position.

17. The system of claim 16 wherein the received signal strength vectors include attenuation from path loss and fading.

18. The system of claim 16 wherein localization is determined by finding a best match sequence in the sequence-centroid table to the received signal strength vectors.

19. The system of claim 12 wherein at least one of the one or more mobile devices, fixed nodes, or the server is configured to:
   divide physical space into a plurality of pre-defined zones;
   determine an optimum power vector and an optimal warp vector for each zone of the plurality of pre-defined zones to form a plurality of multiple sequence-centroid tables and a plurality of warp vectors;

determine current zone in which a target node is located;

select one warp vector to transform each received signal strength vector at the target node present in the current zone; and localize the target node by finding a best match sequence in a sequence-centroid table for the current zone.

20. A method for localizing a mobile device in a physical space, the method comprising:
   a) generating one or more received signal strength vectors from wireless signals exchanged between a plurality of fixed nodes and one or more mobile devices to be located, each received signal strength vector providing relative signal strengths between one of the one or more mobile devices and each of the fixed nodes, the plurality of fixed nodes defining initial Sequence Based Localization (SBL) faces in a physical localization space having an initial largest SBL face;
   b) transforming each received signal strength vector of the one or more received signal strength vectors to form a plurality of transformed signal strength vectors such that transformed SBL faces have a largest transformed SBL face that is reduced compared to the initial largest SBL face wherein the transforming comprises adding a warp vector to each received signal strength vector, the warp vector being a difference of an optimal transmit power vector and an actual transmit power vector, the largest transformed SBL face being minimized by finding the optimal transmit power vector; and
   c) determining a location for each of the one or more mobile devices from the plurality of transformed signal strength vectors.

21. The method of claim 20 wherein the optimal transmit power vector is calculated by simulated annealing.

* * * * *